May 7, 1935.    C. W. STEWARD    2,000,722

EXHAUST MANIFOLD

Filed Jan. 6, 1933

INVENTOR
COLBY W. STEWARD.

BY HIS ATTORNEY

Patented May 7, 1935

2,000,722

UNITED STATES PATENT OFFICE 2,000,722

EXHAUST MANIFOLD

Colby W. Steward, Kenmore, N. Y., assignor to Curtiss Aeroplane & Motor Company, Inc., a corporation of New York Application January 6, 1933, Serial No. 650,467

8 Claims. (Cl. 60—29)

This invention relates to multi-cylinder internal combustion engines, and more particularly to improvements in exhaust manifolds for such engines.

In high performance aircraft engines, particularly those engines in which the cylinders are in line, it has been customary in the past to provide the exhaust port of each cylinder with an individual short tubular exhaust stack. Such stacks are awkward in appearance, and since they necessarily protrude from the engine body into the slipstream of the aircraft, they cause an unnecessary degree of drag, which has a tendency to impede the speed of the aircraft. These stacks assist in accentuating the sharp exhaust noise from the cylinders, objectionable both to occupants of the aircraft in flight and to those on the ground, and sometimes allow an inrush of cold air when the aircraft is sideslipped, causing damage to the hot valves of the engine.

Mufflers and extended manifolds reduce the sharpness of the engine exhaust noise, but require additional weight, which is at a premium in heavier-than-air craft, and usually impose an exhaust back pressure on the high performance engine which causes loss of power and possible overheating of the valves.

My invention provides a simple, light exhaust manifold for engines of the type mentioned, having the following objects:

(a) To allow free passage of the exhaust gas to the outside air, without restriction;

(b) To provide an exhaust manifold which may be readily streamlined, minimizing parasitic drag;

(c) To provide a unitary manifold which may be readily attached and detached;

(d) To provide a manifold which has the effect of moderating the sharp exhaust reports of the individual cylinders;

(e) To provide a manifold which may be fabricated from a light metal casting, such as aluminum;

(f) To provide a cast aluminum exhaust manifold which is not likely to burn or melt;

(g) To provide a manifold which will prevent an inrush of cold air, which might cause such damage as warping to the hot valves of the engine.

Further objects of the invention will be apparent from a consideration of the drawing, from the following description, and from the claims.

For a clearer understanding of the invention, reference may be made to the drawing, in which similar numbers designate similar parts, and in which.

Figure 1:
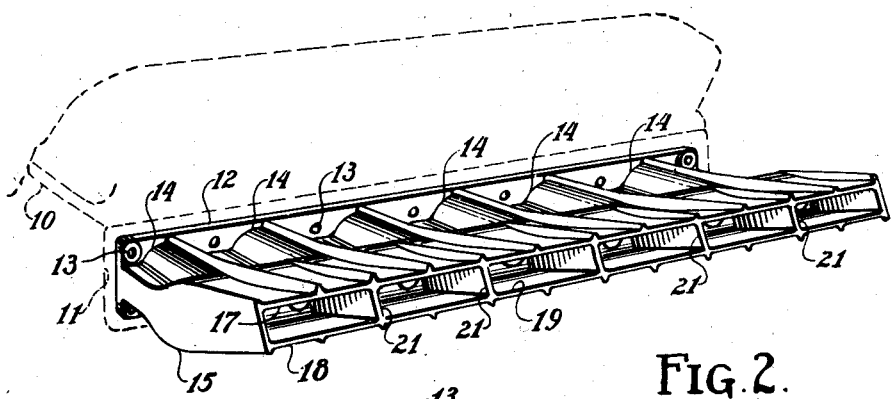
Fig. 1 is a perspective view of the manifold as applied to one bank of a V type multi-cylinder engine.
Figure 2:
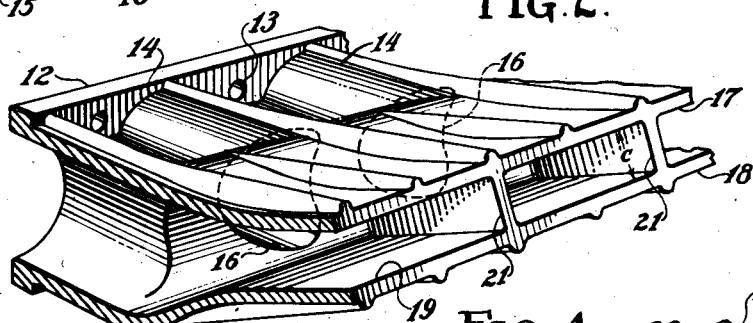
Fig. 2 is a perspective view of a portion of Fig. 1, partly in section to show the interior construction.
Figure 3:
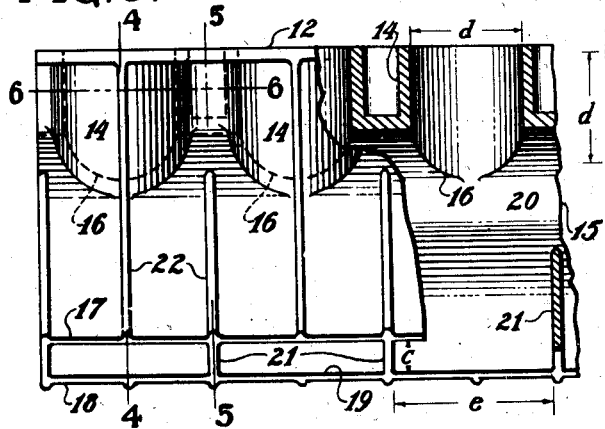
Fig. 3 is a plan, partly broken away, of a portion of the manifold.
Figure 4:
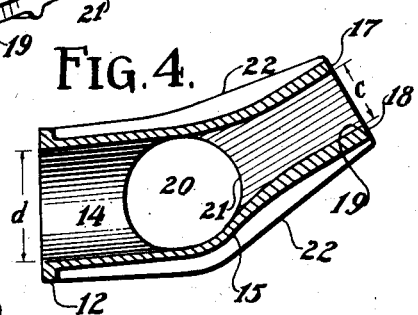
Figure 5:
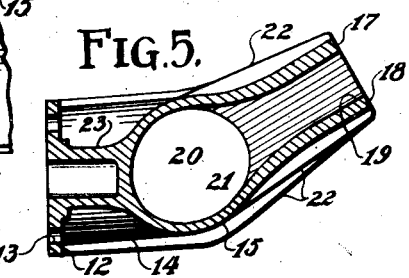
Figure 6:
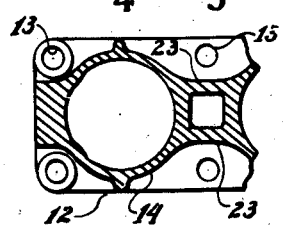

Figs. 4, 5 and 6 are sections on the lines 4—4, 5—5 and 6—6, respectively, of Fig. 3.

In the drawing, a conventional engine cylinder head 10 is provided with a flat face 11 to which any exhaust pipes or manifolds may be attached. Exhaust ports, not shown, are formed in the cylinder head 10 and are open to the outside at the face 11.

The manifold of the invention is provided with a flange 12 adapted to lie adjacent the face 11, and to be attached thereto by suitable bolts and nuts, to be inserted through openings 13 formed in the flange. Extending out from said flange are a plurality of short stacks 14, the hollow of each stack extending through the flange 12 to register with an engine exhaust port. Along the outer ends of the row of stacks 14, a substantially U-shaped cylindrical member 15 is attached, the outer ends of the stacks 14 communicating with the hollow of the member 15 by openings 16 formed in the inner portion thereof. The upper and lower side plates 17 and 18, respectively, extend outwardly, away from the cylinders, and taper toward each other, so that the outer edges of the plates are spaced a distance $c$ apart, said distance being somewhat less than the inside diameter $d$ of the stacks 14. A longitudinal opening 19 is thereby formed at the open edges of the plates 17 and 18, of the U member 15, said opening allowing for the free exit of exhaust gases issuing from the several exhaust stacks 14. The chamber 20 which is the hollow of the member 15 acts as a diffusion chamber for the exhaust gases issuing from the stacks 14, before said gases pass to the outside air through the attenuated opening 19, lessening the sharp report of such exhaust gases.

To further strengthen the plates 17 and 18, to provide guides which lead the gases outward, and to provide baffles which tend to prevent an inward rush of air to the manifold, a plurality of partitions 21 are provided between the outer edges of the plates 17 and 18, extending inwardly to define the outer boundary of the chamber 20. These partitions are longitudinally spaced by a distance e, said distance being substantially the same as the distance between centers of the several stacks 14.

By the location of each partition 21 opposite the space between adjacent stacks 14, a rectangular outlet opening is formed, bounded by successive partitions 21 and by the upper and lower plates 17 and 18, through which the main blast of exhaust gas issuing from the opposite stack 14 may pass. The area of such opening is equal to, or greater than, the cross sectional area of any of the stacks 14, and so causes no restriction of out-flowing gas. The chamber 20, however, allows part of such gas to dissipate and pass out through the other rectangular openings formed as part of the main opening 19, allowing for moderation of exhaust noise and for the distribution of heat.

The purpose of the chamber 20 is to allow for a slight interflow of gases from the various exhaust stacks before they mingle with the outside air, and to eliminate a hot spot, at a location where normal tubular exhaust stacks become extremely hot. In actual practice, common exhaust stacks become hottest at a distance removed from the cylinder port, the distance being about one exhaust port diameter removed from the port. With this effect in mind, the continuous chamber 20 is made just at this location to allow for additional expansion space for the hot gases at this point and to hold the manifold at a substantially uniform temperature. This chamber is made cylindrical in order to eliminate flat surfaces to prevent pulsation or panting of the material, which occurs in flat surfaces. Likewise, the tubular exhaust stacks 14 between the engine exhaust ports and the chamber 20 are so made to eliminate flat surfaces to avoid pulsation or panting. It has been found in the past that, regardless of the material from which stacks may be made, if they are not given a curved conformation the flat material will pulsate under the repetitive exhaust impulses, eventually fracturing the material. In many instances, sections of flat exhaust manifold plates have actually blown out regardless of the material from which they may be made. After the gases have had a slight opportunity to expand in the region of the chamber 20, and after they receive a slight admixture of cool air therefrom, the cooler gases may pass from the rectangular ducts 19 to the atmosphere. It should be appreciated that all of the cylinders do not exhaust at once into this manifold—they exhaust in more or less consecutive order, so that the gases issuing from any one exhaust port at any instant will tend to pass through the directly opposite outlet port 19. The draft caused by the passage of the gases through the chamber 20 will tend to suck cooler air from adjacent ports 19 through the chamber 20 to keep this ordinarily hottest part of the structure, cool.

The tubular stacks 14 are also a convenient form for manufacture and still more important, they provide external accessibility to the studs which hold the manifold to the cylinder block at the openings 13. The utility of the shape of the ducts 19 accrues from the straight line conformation of the manifold as a whole. It will be appreciated that the normal engine installations in the past have utilized straight circular exhaust stacks projecting from the cowling surrounding the engine. The line of stacks thus formed offers an unnecessary degree of drag in the aircraft and by the varied length of the stacks, they protrude from the engine cowling in a slightly curved line which is not parallel to the airstream flowing thereover. By providing the unitary manifold of this invention, the series of outlets are aligned in a straight line parallel to the airstream flowing thereover, and thereby, offer less parasitic drag.

The manifold above described could readily be fabricated from sheet metal, welded or riveted to the proper form, but the preferred embodiment, as shown, combines the various elements in a single unitary casting. The casting may be made from aluminum, or from suitable casting alloys of that metal, giving the advantage of lightness, rigidity, and low cost. As a casting, it would be desirable to form stiffening webs 22 across the plates 17 and 18, and to form webs 23 between adjacent stacks 14.

When used with V-type aircraft engines, the stacks 14 would tend to point outwardly and downwardly, so the U member 15 may be formed to change the direction of the gases, ejecting them horizontally or upwardly. The formation of the manifold may readily be changed, without departing from the scope of the invention, to adapt it to engines of different form, and to accommodate it to cowling or body structure surrounding the engine.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A unit exhaust manifold for a multi-cylinder engine comprising an upper longitudinal plate, a lower longitudinal plate, a plurality of means for joining said plates between the successive engine cylinder exhaust ports, said means being adapted for attachment to said cylinders, and a plurality of partitions for joining the outer edges of said plates, whereby outlet openings are formed by the juxtaposition of said plates and of said partitions, and whereby a longitudinal passage is formed by the boundaries established by said upper and lower plates, said means, and the inner edges of said partitions.

2. An exhaust manifold for a multi-cylinder internal combustion engine comprising a unit cored casting, said casting having openings to register with the exhaust ports of the individual cylinders, having formed therein a passage bridging and registering with said openings, and having formed therein a plurality of openings communicating with said passage and with the outside air.

3. An exhaust manifold for a multi-cylinder internal combustion engine comprising a unit cored casting, said casting having openings to register with the exhaust ports of the individual cylinders, having formed therein a passage bridging and registering with said openings, and having formed therein a plurality of openings communicating with said passage and with the outside air, said last mentioned openings being substantially opposite said first mentioned openings.

4. An exhaust manifold for a multi-cylinder internal combustion engine having exhaust ports for the individual cylinders arranged in substantially a straight line, comprising a unit cored casting having a common passage into which the exhaust gases are led, said casting having formed therein a plurality of substantially rectangularly shaped outlet openings arranged in a line substantially parallel to said cylinder ports.

5. An exhaust manifold for a multi-cylinder internal combustion engine having exhaust ports for each cylinder, including a substantially cylindrical chamber into which the exhaust gases from the cylinders are adapted to pass, said chamber having a narrow opening along a side thereof for the escape of gases therefrom, and a plurality of spaced inwardly extending partitions carried by said chamber adjacent the edges of said opening.

6. An exhaust manifold for a multi-cylinder internal combustion engine including a plurality of stacks attached to said cylinders, said stacks being adapted to register with the exhaust ports of the several cylinders, a substantially cylindrical chamber bridging the outer ends of said stacks and into which said gases may pass and mingle, and said chamber having formed therein a narrow outlet opening substantially coextensive with the length thereof.

7. An exhaust manifold for a multi-cylinder internal combustion engine including a plurality of stacks attached to said cylinders, said stacks being adapted to register with the exhaust ports of the several cylinders, a substantially cylindrical chamber bridging the outer ends of said stacks and into which said gases may pass and mingle, said chamber having formed therein a narrow outlet opening substantially coextensive with the length thereof, and inwardly extending partitions carried by and bridging the edges of said opening, said partitions being adapted to reinforce said edges from spreading and to minimize an inrush of external air to said chamber.

8. In combination with an in-line multi-cylinder engine having circular exhaust ports adjacent the upper cylinder ends, a unit exhaust manifold into which the exhaust gases from said cylinders may pass, said manifold having an outlet opening substantially coextensive with the length of said engine, the width of said opening being less than the diameter of any said exhaust ports, but the outlet area thereof being substantially equal to or greater than the combined area of said exhaust ports.

COLBY W. STEWARD.